(12) United States Patent
Wilson et al.

(10) Patent No.: US 11,222,063 B2
(45) Date of Patent: Jan. 11, 2022

(54) DYNAMIC QUERY ADJUSTMENT BASED ON DATA PROTECTION CONFIGURATIONS

(71) Applicant: Microsoft Technology Licensing, LLC, Redmond, WA (US)

(72) Inventors: Adam Donald Wilson, Seattle, WA (US); Won Hee Lee, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 16/374,187

(22) Filed: Apr. 3, 2019

(65) Prior Publication Data

US 2020/0320117 A1   Oct. 8, 2020

(51) Int. Cl.
*G06F 16/53* (2019.01)
*G06F 21/62* (2013.01)
(Continued)

(52) U.S. Cl.
CPC .......... *G06F 16/53* (2019.01); *G06F 16/3349* (2019.01); *G06F 16/51* (2019.01);
(Continued)

(58) Field of Classification Search
CPC ........ G06F 16/13; G06F 16/134; G06F 16/14; G06F 16/256; G06F 16/2471;
(Continued)

(56) References Cited

U.S. PATENT DOCUMENTS

| | | | |
|---|---|---|---|
| 8,082,242 B1 | 12/2011 | Mysen et al. | |
| 8,638,385 B2 * | 1/2014 | Bhogal | H04N 5/23225 348/333.02 |

(Continued)

FOREIGN PATENT DOCUMENTS

CN   102393805 A  *  3/2012  ........... G06F 3/0488

OTHER PUBLICATIONS

Pogorelov, et al., "OpenSea—Open Search Based Classification Tool", In Proceedings of 9th ACM Multimedia Systems Conference, Jun. 12, 2018, pp. 363-368.
(Continued)

*Primary Examiner* — James E Richardson
(74) *Attorney, Agent, or Firm* — Watson Patents, PLC; Vladan M. Vasiljevic

(57) ABSTRACT

Aspects of the present disclosure relate to systems and methods for dynamically adjusting queries based on data protection configurations. In one example, a request for data is received from an application. The data is indexed in at least one of a first index database, a second index database and a third index database. A first key notification indicating a protection status of a personal device is received. A query is sent to each of the first index database, the second index database and the third index database for the requested data based on the protection status of the personal device. The requested data is loaded into the application. A second key notification indicating a change in the protection status of the personal device is received. At least some of the loaded data is removed from the application based on the change in the protection status of the personal device.

20 Claims, 7 Drawing Sheets

(51) Int. Cl.
  *G06F 16/901* (2019.01)
  *G06F 16/903* (2019.01)
  *G06F 16/33* (2019.01)
  *G06F 16/51* (2019.01)
(52) U.S. Cl.
  CPC .......... *G06F 16/901* (2019.01); *G06F 16/903* (2019.01); *G06F 21/6218* (2013.01)
(58) Field of Classification Search
  CPC .......... G06F 16/27; G06F 16/51; G06F 16/53; G06F 16/901; G06F 16/903; G06F 21/6209; G06F 21/6218; G06F 16/3349
  See application file for complete search history.

(56) References Cited

U.S. PATENT DOCUMENTS

| | | | |
|---|---|---|---|
| 8,930,332 B2 | 1/2015 | Burstein | |
| 9,037,620 B2 | 5/2015 | Ellison et al. | |
| 9,092,525 B2 | 7/2015 | Nandakumar et al. | |
| 9,785,786 B2 | 10/2017 | Mattsson et al. | |
| 10,083,315 B2 | 9/2018 | Lee | |
| 10,146,949 B2* | 12/2018 | Jin | G06F 3/0483 |
| 10,630,630 B1* | 4/2020 | Khawand | H04M 1/67 |
| 2011/0225165 A1 | 9/2011 | Burstein et al. | |
| 2012/0009896 A1* | 1/2012 | Bandyopadhyay | H04L 63/0861 455/411 |
| 2014/0201195 A1 | 7/2014 | Kirazci et al. | |
| 2014/0289223 A1* | 9/2014 | Colwell | G06F 16/2455 707/722 |
| 2014/0344952 A1 | 11/2014 | Kulick et al. | |
| 2017/0242912 A1 | 8/2017 | Mohassel et al. | |
| 2018/0246957 A1 | 8/2018 | Ago et al. | |

OTHER PUBLICATIONS

"International Search Report and Written Opinion Issued in PCT Application No. PCT/US20/024757", dated Jun. 16, 2020, 13 Pages.

* cited by examiner

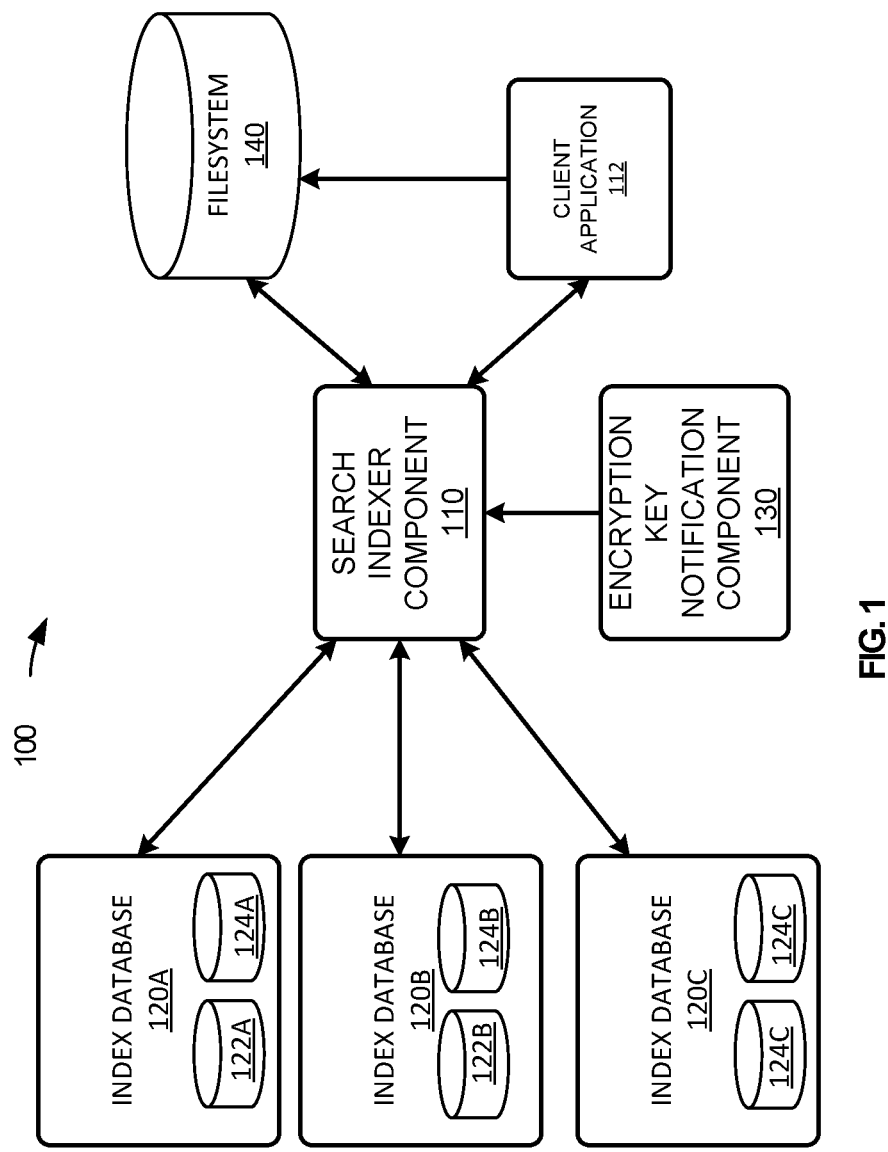

DYNAMIC QUERY ADJUSTMENT BASED ON DATA PROTECTION CONFIGURATIONS

BACKGROUND

Operating system searches maintain a single index for the entire computer system. However, utilizing a single index for the entire computer system prevents fulfilling data protection requirements such as various protection levels. Furthermore, a single index for the entire computer system cannot handle granularity for multiple protection levels for each user of the computer system. As such, current technology for indexing data and facilitating operating system searches on the indexed data requires a single index for the entire computer system; ultimately resulting in unprotected data and unsatisfied enforcement and protection requirements.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for dynamically adjusting queries based on data protection configurations. In one example, a request for data is received from an application. The data is indexed in at least one of a first index database, a second index database and a third index database. A first key notification indicating a protection status of a personal device is received. A query is sent to each of the first index database, the second index database and the third index database for the requested data based on the protection status of the personal device. The requested data is loaded into the application. A second key notification indicating a change in the protection status of the personal device is received. At least some of the loaded data is removed from the application based on the change in the protection status of the personal device.

In another aspect, a request for data is received from an application associated with a personal device. A protection status of the personal device is determined. One or more queries are sent to one or more index databases in accordance with the protection status of the personal device. A key notification indicating a change in the protection status of the personal device is received. One or more additional queries for additional data are sent to the one or more indexes databases in accordance with the changed protection status of the personal device. Data received from the one or more queries is merged with additional data received from the one or more additional queries. The merged data is loaded to the application.

In yet another aspect, a first index database for indexing data is constructed. The first index database has a first data protection level. A second index database for indexing data is constructed. The second index database has a second data protection level. The second index database is encrypted based on the second data protection level. A third index database for indexing data is constructed. The third index database has a third data protection level. The third index database is encrypted based on the third data protection level. Data for indexing is identified, where the data is classified as a data type from a plurality of data types. The data identified for indexing is indexed in one of the first index database, the second index database, and the third index database based on the data type of the data.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

FIG. 1 illustrates an exemplary data protection system, according to an example aspect.

DETAILED DESCRIPTION

Figure 2A:
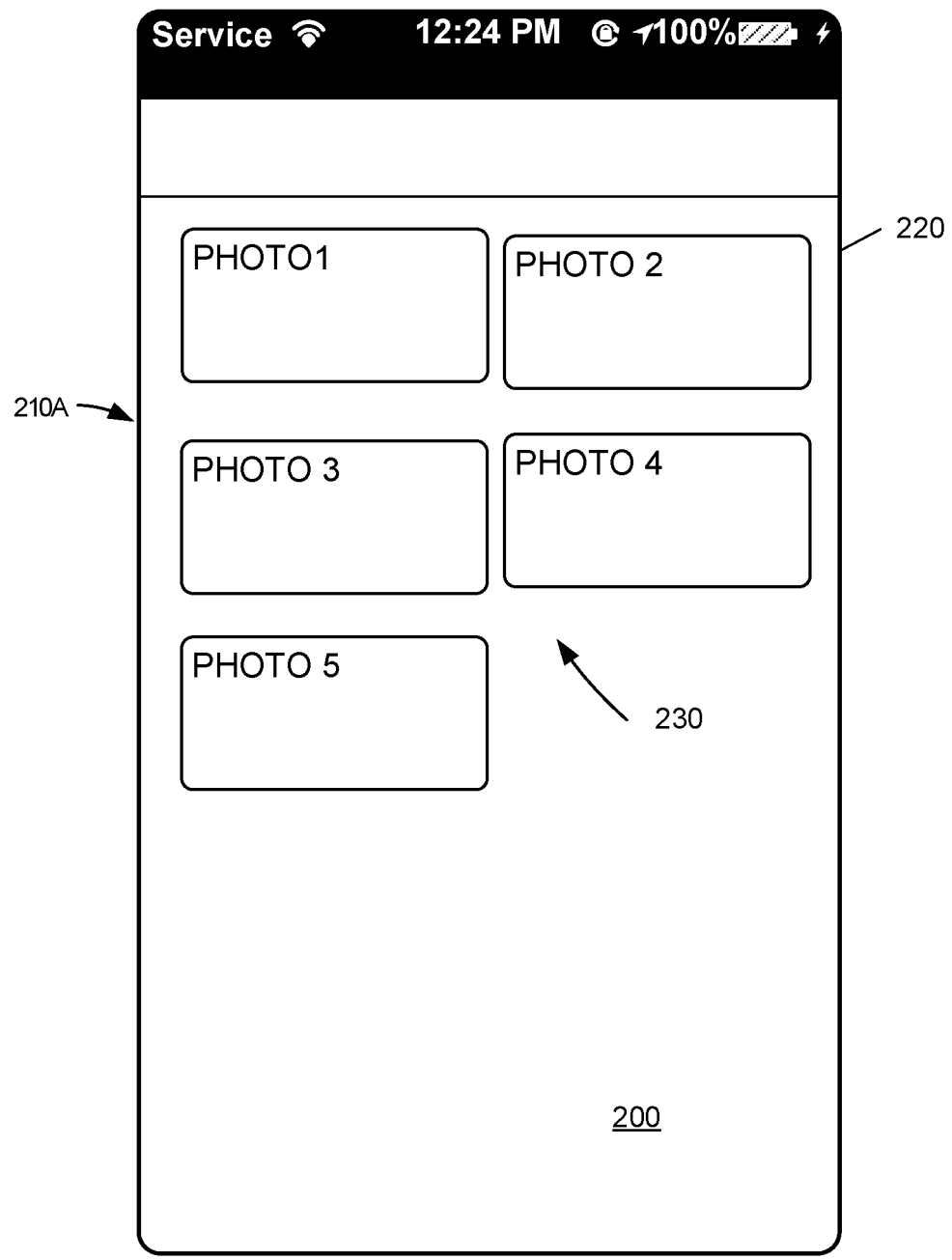
FIG. 2A illustrates one view of a client computing device, according to an example aspect.

Aspects of the disclosure are generally directed to dynamically adjusting queries based on data protection configurations. For example, private data on a personal device should be encrypted such that when the device is locked and/or stolen, the private data cannot be accessed. The private data may include data indexed for an operating system search (e.g., such as Windows® Search). The data protection configurations of the present disclosure facilitate protecting private data at multiple protection levels and per user while satisfying various enforcement requirements. Furthermore, queries for the protected data may be dynamically adjusted to enforce and maintain protection of the private data. In one example, multiple indexes having different protection levels may be encrypted to protect the data. In another example, a query may be dynamically adjusted based on a change in the protection status of a personal device such that only data that should be accessible in view of the protection status of the personal device is loaded to an application requesting the data.

As discussed above, operating system searches maintain a single index for the entire computer system. However, utilizing a single index for the entire computer system prevents fulfilling data protection requirements such as various protection levels. Furthermore, a single index for the entire computer system cannot handle multiple protection levels for each user of the computer system. As such, current technology for indexing data and facilitating operating system searches on the indexed data requires a single index for the entire computer system, ultimately resulting in unprotected data and unsatisfied enforcement and protection requirements.

Accordingly, aspects described herein include constructing at least a first index database, a second index database, and a third index database for indexing data. Each index database may have a different data protection level. For example, the first index database may have a first data protection level. The second index database may have a second data protection level. The third index database may have a third data protection level. Each data protection level may provide access to data classified as a different data type. For example, data classified as an unprotected data type may be indexed in the first index database having the first data protection level. In this regard, the first data protection level may include data classified as unprotected. In another example, data classified as protected until first unlock of a personal device may be indexed in the second index database having the second data protection level. In yet another example, data classified as protected when a personal device is locked may be indexed in the third index database having the third data protection level. One or more of the index databases may be encrypted based on the data protection level. Data for indexing may be identified and indexed in one of the first index database, the second index database, and the third index database based on the data type of the data. Accordingly, a technical effect that may be appreciated is that security is improved by constructing multiple indexes that are encrypted and have multiple protection levels for data. In this regard, the technology disclosed herein satisfies enforcement and protection requirements while maintaining a fast search on private/protected data.

In another aspect, a request for data is received from an application. As discussed above, the data may be indexed in at least one of a first index database, a second index database and a third index database. A first key notification indicating a protection status of a personal device may be received. A query may be sent to one or more of the first index database, the second index database and the third index database for the requested data based on the protection status of the personal device. For example, the protection status of the personal device may be unlocked which indicates that the first index database, the second index database, and the third index database are available and accessible to query for data. In this example, a query is sent to each index database for data. The requested data may be received and loaded into the application. A second key notification indicating a change in the protection status of the personal device may be received. For example, the protection status of the personal device may be changed from unlocked to locked. In this example, at least some of the loaded data (e.g., data that is protected when the personal device is in a locked state) is removed/unloaded from the application based on the change in the protection status of the personal device.

In another example, a key notification may be received indicating that the protection status of the personal device is locked. A query may be sent to the first index database and/or the second index database. The third index database may include data that is protected when the protection status of the personal device is locked and therefore is not accessible. For example, an encryption key required for accessing the protected data may be removed from memory. The requested data may be received from the first index database and/or the second index database and loaded into the application. Another key notification indicating a change in the protection status of the personal device may be received. For example, the protection status of the personal device may be changed from locked to unlocked. In this example, another query may be sent to the third index database (e.g., which is now accessible based on the protection status change) for the requested data. The data from the third index database may be merged with the data from the first index database and/or the second index database that was previously loaded into the application. The merged data may be dynamically loaded to the application. A notification may be sent to the application to indicate the change in data and/or protection status of the personal device. As such, another technical effect that may be appreciated is that data protection and data query/searching technology is improved via the techniques disclosed herein by at least dynamically adjusting queries/searches based on data protection configurations. In this regard, the solution described herein is necessarily rooted in computer technology in order to overcome a problem specifically arising in the realm of computer data protection, and in particular with operating system index searches.

Referring now to the drawings, in which like numerals represent like elements through the several figures, aspects of the present disclosure and the exemplary operating environment will be described. With reference to FIG. 1, one aspect of a data protection system 100 for dynamically adjusting queries based on data protection configurations is illustrated. The data protection system 100 may include a plurality of index databases 120A-120C, a search indexer component 110, an encryption key notification component 130, a client application 112, and a filesystem 140. In aspects, the data protection system 100 may be implemented on a client computing device. In a basic configuration, the client computing device is a handheld computer having both input elements and output elements. The client computing device may be any suitable computing device for implementing the data protection system 100 for dynamically adjusting queries based on data protection configurations. For example, the client computing device may be a computing apparatus or a personal device such as: a mobile telephone; a smart phone; a tablet; a phablet; a smart watch; a wearable computer; a personal computer; a desktop computer; a laptop computer; a gaming device/computer (e.g., Xbox); a television. This list is exemplary only and should not be considered as limiting. Any suitable client computing device for implementing the data protection system 100 for dynamically adjusting queries based on data protection configurations may be utilized.

The various components may be implemented using hardware, software, or a combination of hardware and software. As discussed above, the data protection system 100 may include the plurality of index databases 120A-120C, the search indexer component 110, the encryption key notification component 130, the client application 112, and the filesystem 140. In one example, the search indexer component 110 may include an operating system service that handles indexing of files/data for the operating system search (e.g., a file/data search engine). In one example, the search indexer component 110 includes the Windows® Service, SearchIndexer.exe, for Windows® Search (WSearch).

The search indexer component 110 may be configured to construct the plurality of index databases 120A-120C for indexing data. The plurality of index databases 120A-120C may include index data structures stored in databases. The plurality of index databases 120A-120C may each include two database tables. For example, a first index database 120A may include a first database table 122A and a second database table 124A. A second index database 120B may include a first database table 122B and a second database table 124B. A third index database 120C may include a first database table 122C and a second database table 124C. In this regard, each user of the client computing device/personal device may have the plurality of index databases 120A-120C with different protection levels, as is described in more detail below. The first database tables 122A-122C may include a table that has the metadata of the data and the second database tables 124A-124C may include an inverted index binary data structure.

Each of the plurality of index databases 120A-120C may have a different data protection level. For example, the first index database 120A may have a first data protection level. The first index database 120A may include data that is classified as an unprotected data type (e.g., data that is unprotected). In this regard, the first data protection level may provide access to data classified as the unprotected data type. In another example, the second index database 120B may have a second data protection level. The second index database 120B may include data that is classified as a protected until first unlock of a personal device data type (e.g., data that is protected until the first unlock of the personal device). In this regard, the second data protection level may provide access to data classified as the protected until first unlock of the personal device data type. In another example, the third index database 120C may have a third data protection level. The third index database 120C may include data that is classified as a protected when a personal device is locked data type (e.g., data that is protected whenever the personal device is locked). In this regard, the third data protection level may provide access to data classified as the protected when the personal device is locked data type.

One or more of the plurality of index databases 120A-120C may be encrypted based on its corresponding data protection level. In one example, the second index database 120B is encrypted based on the second data protection level and the third index database 120C is encrypted based on the third data protection level. In this regard, an encryption key is required to access any of the plurality of index databases 120A-120C that are encrypted. As discussed above, the data protection system 100 may include the client application 112 and the filesystem 140. The client application 112 may include any software application run by a client computing device/personal device/computing apparatus as described herein. For example, the client application 112 may include software applications such as camera applications, email applications, word processing applications, digital assistant applications, and the like.

The client application 112 may be configured to generate data. For example, a camera application may be configured to generate photos. The client application 112 may write its generated data to the filesystem 140 for storage. In this regard, the search indexer component 110 may further be configured to monitor the filesystem 140 for changes in data. For example, when new data is written to the filesystem 140, the search indexer component 110 may identify this change to the filesystem 140. In another example, when already existing data is changed in the filesystem 140, the search indexer component 110 may identify the change in data. When the search indexer component 110 identifies changes in data, the search indexer component 110 may index the data in one of the plurality of index databases 120A-120C. For example, the search indexer component 110 may index relevant information about the data such as metadata. In one example, the data may include any information suitable for storing, indexing, and searching such as text files, word processing files, photos, videos, emails, chats, calendar items, notifications, music, and the like.

The data stored in the filesystem 140 may have a flag indicating its data type. For example, as discussed above, the data of the present disclosure may be classified as one of unprotected, protected until first unlock of the personal device, and protected when the personal device is locked. In one example, the data may be flagged and classified by a user of the personal device. In another example, a component of the personal device such as a photo viewing application or lock screen can flag and classify a folder and/or collection of data. In this regard, the search indexer component 110 may determine which index database of the plurality of index databases 120A-120C to index the data based on the data type/classification of the data. When identified data is classified as the unprotected data type, the data may be indexed in the first index database 120A having the first data protection level. When identified data is classified as the protected until first unlock of the personal device data type, the data may be indexed in the second index database 120B having the second data protection level. When identified data is classified as the protected when the personal device is locked data type, the data may be indexed in the third index database 120C.

In some implementations, when the data is classified as one of the protected until first unlock of the personal device data type or protected when the personal device is locked data type, an encryption key is required to index the data in either the second index database 120B or the third index database 120C. In this regard, the search indexer component 110 may receive a key notification from the encryption key notification component 130 indicating whether the second index database 120B and/or the third index database 120C is available and accessible for indexing data. The encryption key notification component 130 may include a data protection under lock configuration. In one example, the encryption key notification component 130 may include a Consumer Data Protection under Lock (CDPL) configuration. In this regard, the encryption key notification component 130 may be configured to remove encryption keys for accessing data from the personal device memory when the personal device has a protection status such as locked and/or first unlock. As such, when the personal device is lost or stolen there is no way to access protected data, even in a scenario where the locked device is bypassed with direct access to data storage or memory (e.g., without requiring the device be unlocked).

The second index database 120B and/or the third index database 120C may be unavailable when the personal device has a protection status of first unlock or locked. When the personal device has a protection status of first unlock, the search indexer component 110 receives a key notification indicating that the encryption key for the second index database 120B is unavailable. In this example, if the data identified for indexing is classified as the protected until first unlock of the personal device data type, the search indexer component 110 marks the data for indexing as delayed in an indexing queue. When the search indexer component 110 receives another key notification from the encryption key notification component 130 indicating that the encryption key for the second index database 120B is available, the search indexer component 110 may attempt to re-index the data identified for indexing in the second index database 120B.

In another example, when the personal device has a protection status of locked, the search indexer component 110 receives a key notification indicating that the encryption key for the third index database 120C is unavailable. In this example, if the data identified for indexing is classified as the protected when the personal device is locked data type, the search indexer component 110 marks the data for indexing as delayed in the indexing queue. When the search indexer component 110 receives another key notification from the encryption key notification component 130 indicating that the encryption key for the third index database 120C is available, the search indexer component 110 may attempt to re-index the data identified for indexing in the third index database 120B.

In another aspect, the search indexer component 110 is configured to receive a request for data from the client application 112. When the search indexer component 110 receives the request for data from the client application 112, the search indexer component 110 may determine the protection status of the client computing device/personal device. The protection status of the client computing device/personal device may include at least one of locked, unlocked, and first unlock. In some implementations, the protection status of the client computing device/personal device may include additional protection statuses in addition to the at least one of locked, unlocked, and first unlock. In one example, the search indexer component 110 determines the protection status of the personal device by receiving a key notification from the encryption key notification component 130 indicating an availability of at least one encryption key. For example, the key notification may indicate whether an encryption key is available for one of the plurality of index databases 120A-120C. The search indexer component 110 may determine that the protection status of the personal device is locked when the encryption key for the third index database 120C is unavailable. The search indexer component 110 may determine that the protection status of the personal device is first unlock when the encryption key for the second index database 120B is unavailable. The search indexer component 110 may determine that the protection status of the personal device is unlocked when the encryption keys for both the second index database 120B and the third index database 120C are available.

When the protection status of the personal device is determined, the search indexer component 110 may send a query to one or more of the first index database 120A, the second index database 120B and the third index database 120C for the requested data based on the protection status of the personal device. For example, when the protection status of the personal device is unlocked, each of the plurality of index databases 120A-120C are available, and a query may be sent to each of the plurality of index databases 120A-120C. In another example, when the protection status of the personal device is first unlock, the first index database 120A is available and a query may be sent to the first index database 120A. In yet another example, when the protection status of the personal device is locked, the first index database 120A is available and a query is sent to the first index database 120A. In some implementations, when the protection status of the personal device is locked, both the first index database 120A and the second index database 120B are available and a query is sent to both the first index database 120A and the second index database 120B.

The search indexer component 110 may receive the requested data and load it to the client application 112. The search indexer component 110 may receive a key notification indicating a change in the protection status of the personal device from the encryption key notification component 130. For example, the key notification may indicate that an encryption key is available for one of the plurality of index databases 120A-120C or that an encryption key is unavailable for one of the plurality of index databases 120A-120C. When the protection status of the personal device changes to a less protected state (e.g., from locked to unlocked), additional queries may be sent to one or more of the plurality of index databases 120A-120C for additional data. For example, as discussed above, when the protection status of the personal device is locked, either or both the first index database 120A and the second index database 120B are available and data may be accessed from either or both the first index database 120A and the second index database 120B. In this example, if the protection status of the personal device changes from locked to unlocked, the search indexer component 110 receives a key notification indicating the change in the protection status (e.g., the key notification may indicate that the encryption key for at least the third index database 120C is available). As such, the third index database 120C may become available and the search indexer component 110 may send a query to the third index database 120C for additional data. The search indexer component 110 may merge the additional data received from the third index database 120C with the data that was previously received from the first index database 120A and the second index database 120B. In this example, the search indexer component 110 may load the merged data to the client application 112. The search indexer component 110 may send a notification to the client application 112 indicating the change in the retrieved data and/or the change in the protection status of the personal device.

When the protection status of the personal device changes to a more protected state (e.g., from unlocked to locked), at least some of the loaded data may be removed from the client application 112 based on the change in the protection status of the personal device. For example, as discussed above, when the protection status of the personal device is unlocked, each of the plurality of index databases 120A-120C are available, and data may be accessed from each of the plurality of index databases 120A-120C. In this example, if the protection status of the personal device changes from unlocked to locked, the search indexer component 110 receives a key notification indicating the change in the protection status (e.g., the key notification may indicate that the encryption key for at least the third index database 120C is unavailable). As such, data associated with at least the third index database 120C may be unloaded/removed from the client application 112. In this regard, only the remaining data (e.g., data from either or both the first index database 120A and the second index database 120B) can be accessed and/or viewed while the personal device has a locked protection status.

While FIG. 1 illustrates index databases 120A-120C of the data protection system 100, the discussion of index databases 120A-120C is exemplary only and should not be considered as limiting. Any suitable number and/or type of index databases may be utilized in accordance with the present disclosure. For example, any suitable number and/or type of index databases may index the data described herein, be encrypted, and process queries from the search indexer component 110. In some implementations, at least a fourth index database having a fourth data protection level, a fifth index database having a fifth data protection level, a sixth index database having a six data protection level, and so forth, for indexing data of additional data types based on additional protection statuses of the personal device may be utilized in accordance with the present disclosure. In one aspect, index databases 120A-120C may include database indexes (e.g., indexes created by the database) that may be utilized in accordance with the present disclosure.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera functionality for capturing and interpreting user gestures for controlling the functionality of the computing device, and the like.

Referring now to FIG. 2A, one view 210A of a client computing device 200 is illustrated, according to an exemplary aspect of the present disclosure. In aspects, the view 210A is one example of a view a user may encounter when interacting with the client computing device 200. The view 210A may be rendered within the client computing device 200 upon a selection of a client application (not illustrated). As discussed above, the client computing device 200 may be a mobile device, personal device, tablet, and the like. In the example illustrated in FIG. 2A, the client computing device 200 is a mobile device.

In one example, the view 210A and/or the client computing device 200 may include an interface 220 for displaying data 230 (e.g., data associated with a client application). In the example illustrated in FIG. 2A the data 230 includes photo1, photo2, photo3, photo4, and photo5 and the client computing device 200 has a protection status of unlocked. In this regard, when a user of the client computing device 200 opens a camera and/or photo application and searches for photos, the camera and/or photo application may send a request for data based on the search. A query may be sent to each of the plurality of index databases 120A-120C based on the unlocked protection status of the client computing device 200, as described herein relative to FIG. 1. In the example illustrated in FIG. 2A, photo1, photo2, photo3, photo4, and photo5 are returned and loaded to the camera and/or photo application for display in the interface 220.

Figure 2B:
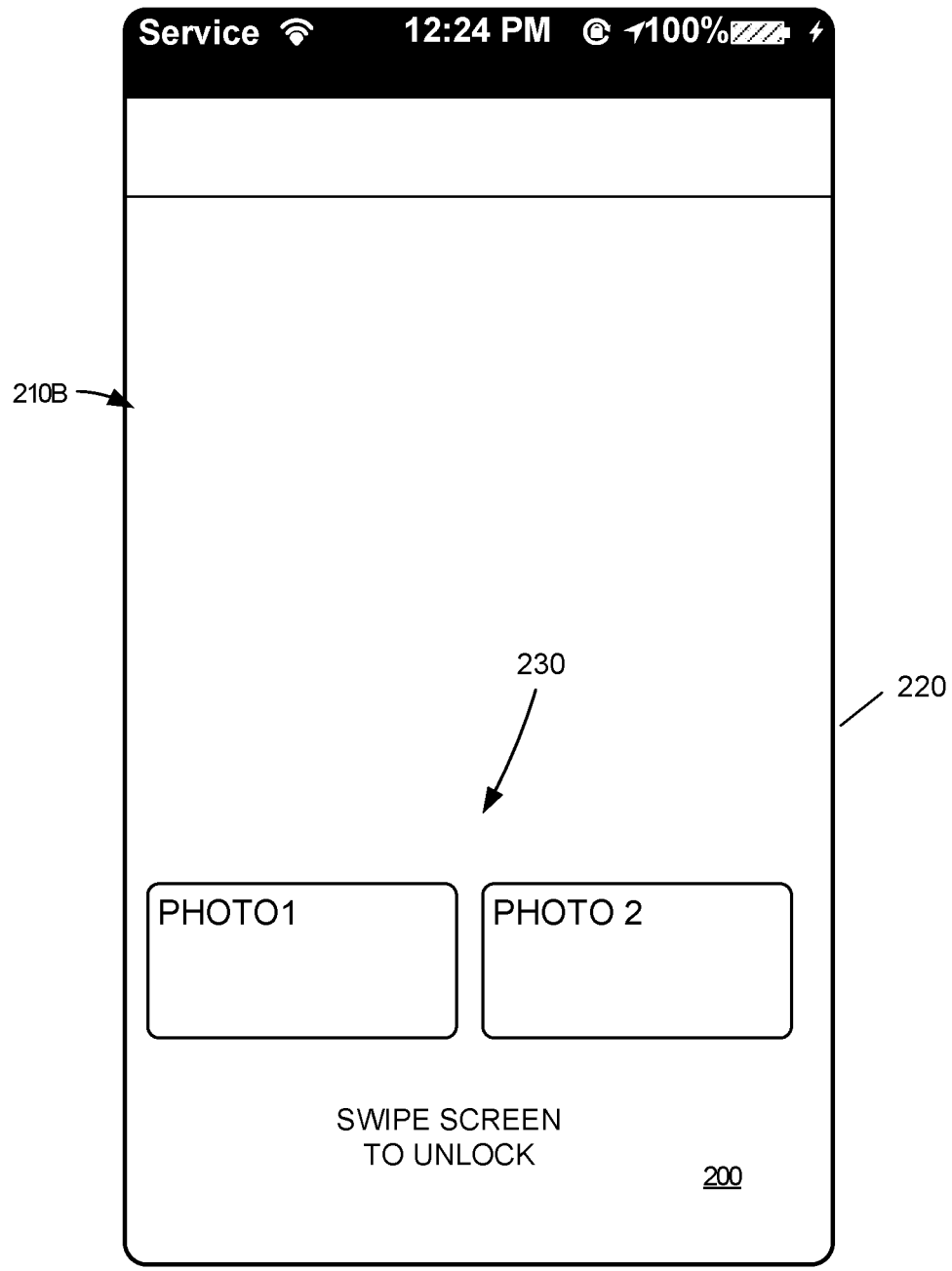
FIG. 2B illustrates another view of the client computing device of FIG. 2A, according to an example aspect.

FIG. 2B illustrates another view 210B of the client computing device 200. The view 210B of the client computing device 200 is another example of a view a user may encounter when interacting with the client computing device 200. The view 210B may be rendered within the client computing device 200 upon a selection of a client application and/or in response to dynamically adjusting a query. In one example, similar to the view 210A of the client computing device 200, the view 210B may include the interface 200 for displaying the data 230. In the example illustrated in FIG. 2B the data 230 includes photo1 and photo2 and the client computing device 200 has a protection status of locked. In this regard, when a user of the client computing device 200 opens a camera and/or photo application and searches for photos, the camera and/or photo application may send a request for data based on the search. In one example, a search may include a user requesting that photos be sorted by a date such as the date a photo was taken. A query may be sent to the first index database 120A and in some scenarios the second index database 120B based on the locked protection status of the client computing device 200, as described herein relative to FIG. 1. Photos that are indexed in the third index database 120C are protected while the client computing device 200 has a locked protection status. In the example illustrated in FIG. 2B, photo1 and photo2 are returned and loaded to the camera and/or photo application for display in the interface 220.

In another example, the data 230 includes photo1 and photo2 in response to a change in the protection status of the client computing device 200. For example, when the client computing device 200 changes from an unlocked protection status (e.g., as illustrated in FIG. 2A) to a locked protection status, a key notification is sent to the search indexer component 110 indicating the change in protection status of the client computing device 200, as described herein relative to FIG. 1. The data 230 (in this example photo3, photo4, and photo5) that is indexed in the third index database 120C is unloaded from the camera and/or photo application based on the locked protection status of the client computing device 200. In this regard, photo3, photo4, and photo5 are unloaded/removed from the camera and/or photo application and are no longer displayed in the interface 220.

Figure 2C:
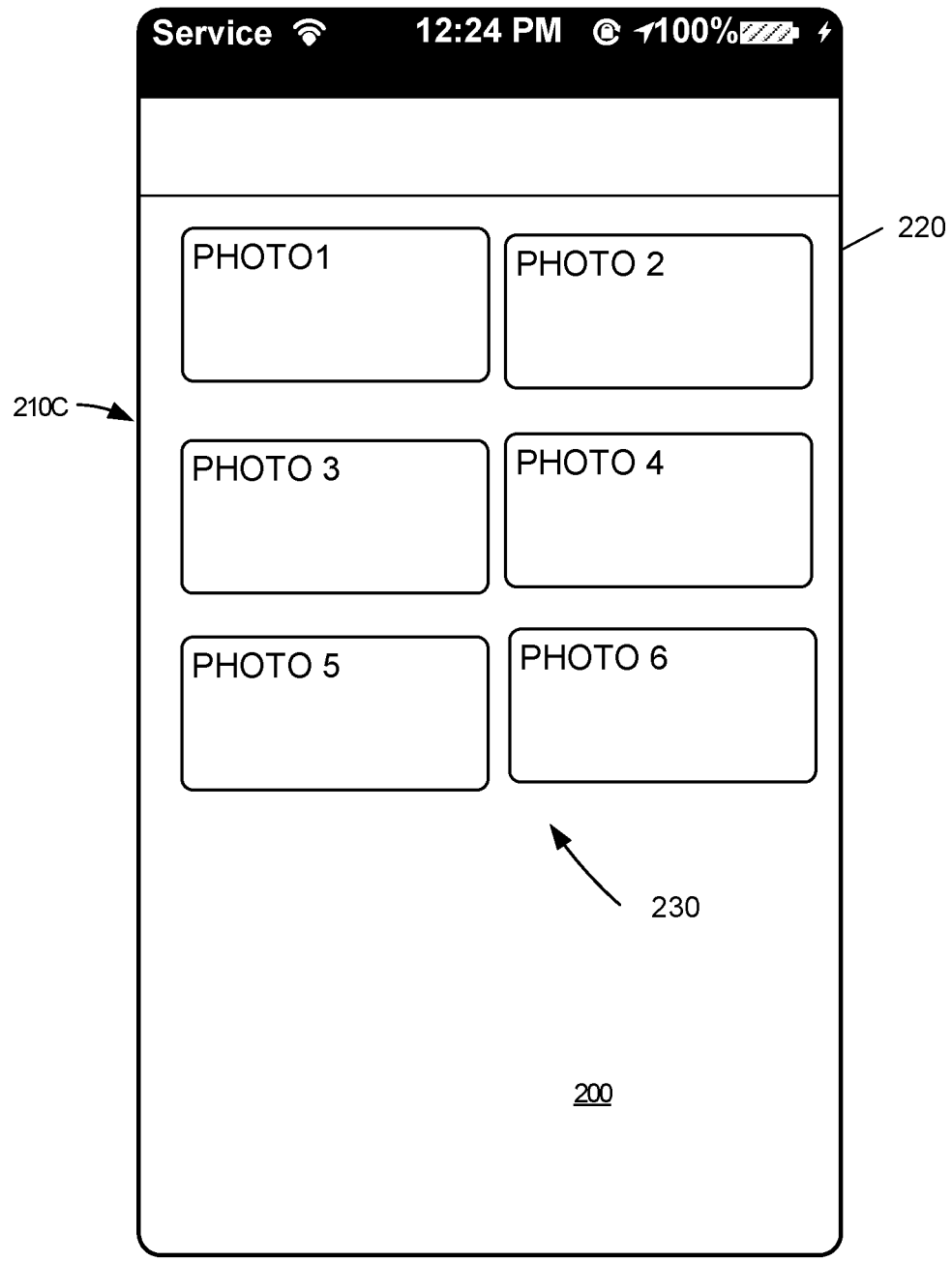
FIG. 2C illustrates another view of the client computing device of FIG. 2A, according to an example aspect.

FIG. 2C illustrates another view 210C of the client computing device 200. The view 210C of the client computing device 200 is another example of a view a user may encounter when interacting with the client computing device 200. The view 210C may be rendered within the client computing device 200 upon a selection of a client application and/or in response to dynamically adjusting a query. In one example, similar to the views 210A and 210B of the client computing device 200, the view 210C may include the interface 200 for displaying the data 230. In the example illustrated in FIG. 2C the data 230 includes photo1, photo2, photo3, photo4, photo5, and photo6 and the client computing device 200 has a protection status of unlocked. In this regard, when a user of the client computing device 200 opens a camera and/or photo application and searches for photos, the camera and/or photo application may send a request for data based on the search. A query may be sent to each of the plurality of index databases 120A-120C based on the unlocked protection status of the client computing device 200, as described herein relative to FIG. 1. In the example illustrated in FIG. 2C, photo1, photo2, photo3, photo4, photo5, and photo6 are returned and loaded to the camera and/or photo application for display in the interface 220.

In another example, the data 230 includes photo1, photo2, photo3, photo4, photo5, and photo6 in response to a change in the protection status of the client computing device 200. For example, when the client computing device 200 changes from a locked protection status (e.g., as illustrated in FIG. 2B) to an unlocked protection status, a key notification is sent to the search indexer component 110 indicating the change in protection status of the client computing device 200, as described herein relative to FIG. 1. The data 230 (in this example photo3, photo4, photo5, and photo6) that is indexed in the first index database 120A and the second index database 120B is merged with the data from the third index database 120C (e.g., photo1 and photo2) and loaded to the camera and/or photo application for display in the interface 220. As such, photo1, photo2, photo3, photo4, photo5, and photo6 are all displayed in the interface 220.

Figure 3:
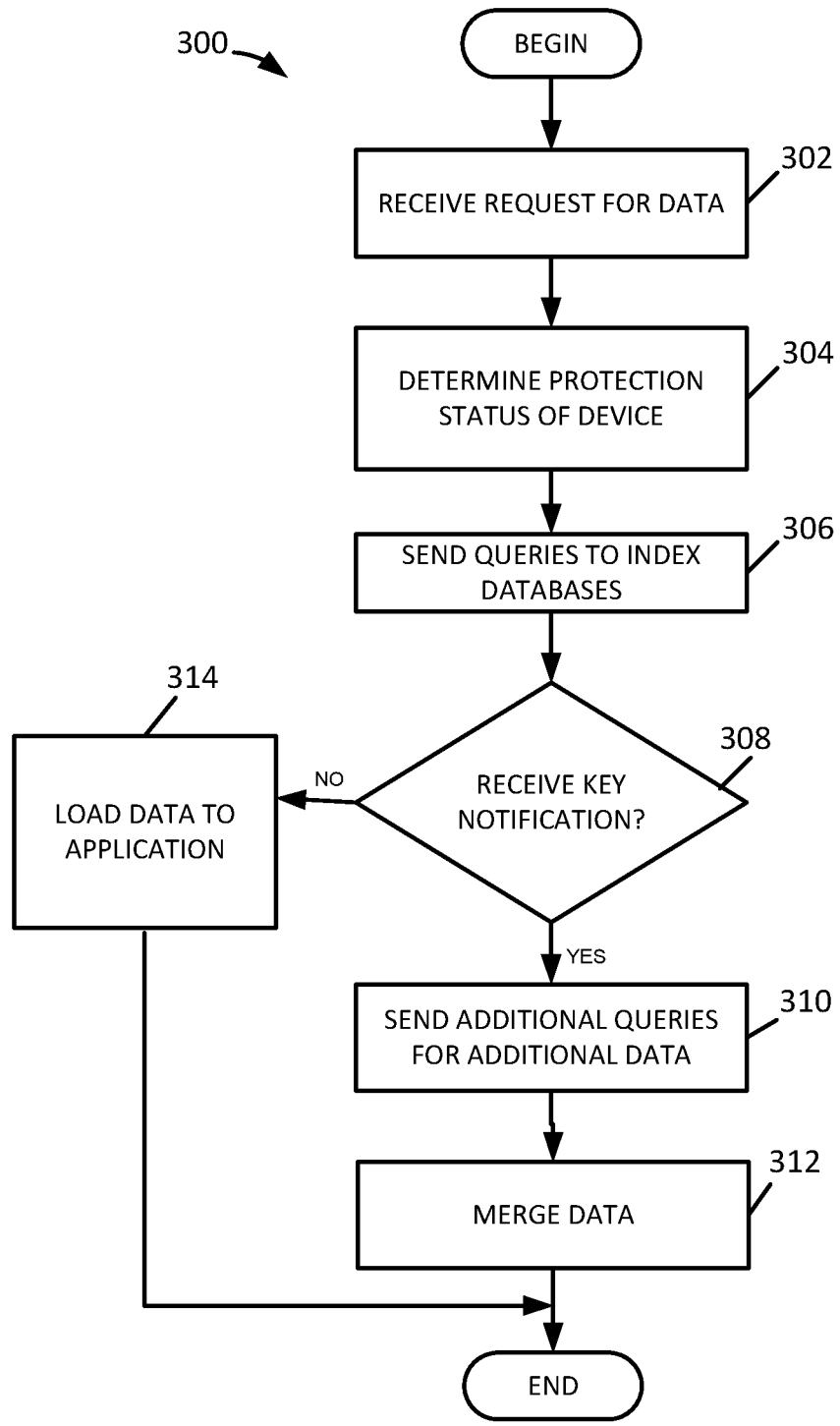
FIG. 3 illustrates an exemplary method for dynamically adjusting a query based on a data protection configuration, according to an example aspect.

Referring now to FIG. 3, an exemplary method 300 for dynamically adjusting a query based on a data protection configuration according to an example aspect is shown. Method 300 may be implemented on a computing device or a similar electronic device capable of executing instructions through at least one processor. Method 300 may begin at operation 302, where a request for data is received from an application associated with a personal device. For example, when a user opens an application and performs a search for data, the application may send a request to a search indexer component for the data. The application may include any software application run by the personal device as described herein. For example, the application may include software applications such as camera applications, email applications, word processing applications, digital assistant applications, and the like. The personal device may include at least one of: a mobile telephone; a smart phone; a tablet; a phablet; a smart watch; a wearable computer; a personal computer; a desktop computer; a laptop computer; a gaming device/computer (e.g., Xbox); a television.

When a request for data is received from an application associated with a personal device, flow proceeds to operation 304 where a protection status of the personal device is determined. In one example, the protection status of the personal device is determined by receiving a key notification indicating an availability of at least one encryption key. For example, the key notification may indicate whether an encryption key is available for one or more of a plurality of index databases. The protection status of the personal device may include one of locked, first unlock, and unlocked. In one example, it may be determined that the protection status of the personal device is locked when an encryption key for the third index database having a third data protection level is unavailable. In another example, it may be determined that the protection status of the personal device is first unlock when an encryption key for the second index database having a second data protection level is unavailable. In yet another example, it may be determined that the protection status of the personal device is unlocked when encryption keys for both the second index database having the second data protection level and the third index database having the third data protection level are available.

When a protection status of the personal device is determined, flow proceeds to operation 306 where one or more queries are sent to one or more index databases in accordance with the protection status of the personal device. For example, when the protection status of the personal device is determined to be unlocked, a query is sent to each of the plurality of index databases based on the unlocked protection status of the personal device. In another example, when the protection status of the personal device is determined to be first unlock, a query may be sent to a first index database based on the first unlock protection status. In yet another example, when the protection status of the personal device is determined to be locked, a query may be sent to a first index database, and in some cases, a second index database based on the locked protection status.

When one or more queries are sent to one or more index databases in accordance with the protection status of the personal device, flow proceeds to decision operation 308 where it is determined whether a key notification indicating a change in the protection status of the personal device is received. For example, the key notification may indicate that an encryption key for accessing one or more of the index databases is available. In another example, the key notification may indicate that an encryption key for accessing one or more of the index databases in unavailable. The key notification indicating a change in the protection status of the personal device may be received while the query or queries is/are being executed. In other words, the protection status of the personal device may change before data is received from the query or queries. In another example, the key notification indicating a change in the protection status of the personal device may be received after data is received from the query or queries but before the data is loaded to an application. In yet another example, the key notification indicating a change in the protection status of the personal device may be received after the data is loaded to an application.

When it is determined that a key notification indicating a change in the protection status of the personal device is not received, flow proceeds to operation 314 where the data from the one or more queries is loaded to the application associated with the personal device. For example, the data received from the one or more queries may be sent to the application requesting the data for display in a user interface to the application. When it is determined that a key notification indicating a change in the protection status of the personal device is received, flow proceeds to operation 310 where one or more additional queries for additional data are sent to the one or more index databases in accordance with the changed protection status of the personal device. For example, when the protection status of the personal device is changed from the locked protection status to the unlocked protection status, one or more additional queries for additional data may be sent to a first index database, and in some cases, a second index database in accordance with the change in the protection status of the personal device. In another example, when the protection status of the personal device is changed from the first unlock protection status to the unlocked protection status, one or more additional queries for additional data may be sent to a second index database in accordance with the change in the protection status of the personal device.

When one or more additional queries for additional data are sent to the one or more index databases in accordance with the changed protection status of the personal device, flow proceeds to operation 312 where the data received from the one or more queries is merged with the additional data received from the one or more additional queries. In one example, the data received from the one or more queries (e.g., from operation 306) may be loaded to the application associated with the personal device before the key notification is received. In this example, the additional data from the one or more additional queries is merged with the data from the one or more queries after the data from the one or more queries is loaded to the application. In another example, the notification key may be received before the data received from the one or more queries is loaded to the application associated with the personal device. In this example, the additional data may be merged with the original data before loading the merged data to the application. In another example, when data is received from more than one index database (e.g., data from multiple queries), the data associated with each index database is merged before it is loaded to the application.

Figure 4:
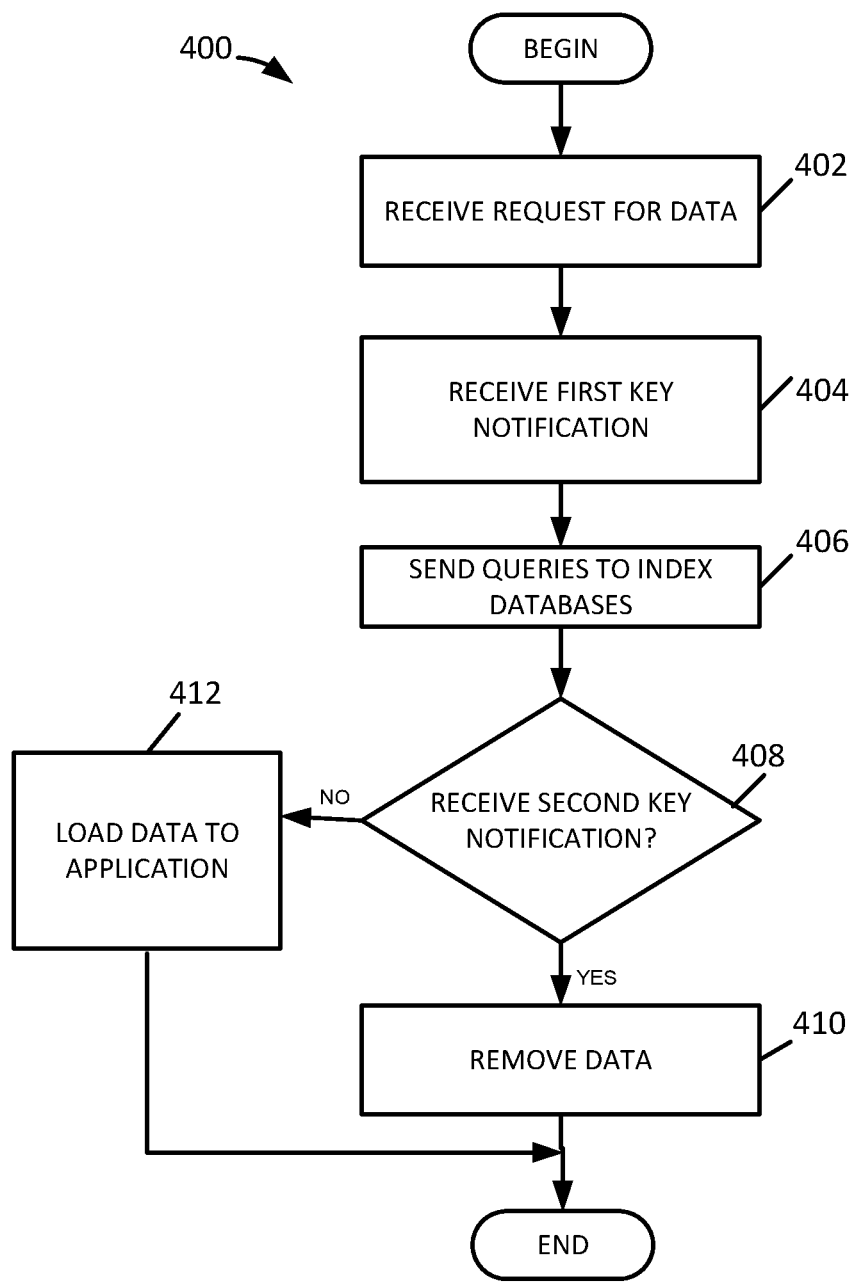
FIG. 4 illustrates an exemplary method for dynamically adjusting a query based on a data protection configuration, according to an example aspect.

Referring now to FIG. 4, an exemplary method 400 for dynamically adjusting a query based on a data protection configuration according to an example aspect is shown. Method 400 may be implemented on a computing device or a similar electronic device capable of executing instructions through at least one processor. Method 400 may begin at operation 402, where a request for data is received from an application. For example, when a user opens an application and performs a search for data, the application may send a request to a search indexer component for the data. The data may be indexed in at least one of a first index database, a second index database and a third index database. The first index database may have a first data protection level. The second index database may have a second data protection level. The third index database may have a third data protection level.

When a request for data is received from an application, flow proceeds to operation 404, where a first key notification indicating a protection status of a computing apparatus is received. In one example, the first key notification may indicate an availability of at least one encryption key. For example, the key notification may indicate whether an encryption key is available for one or more of the first index database, the second index database and the third index database. The protection status of the computing apparatus may include one of locked, first unlock, and unlocked. In one example, it may be determined that the protection status of the personal device is locked when an encryption key for the third index database having a third data protection level is unavailable. In another example, it may be determined that the protection status of the personal device is first unlock when an encryption key for the second index database having a second data protection level is unavailable. In yet another example, it may be determined that the protection status of the personal device is unlocked when encryption keys for both the second index database having the second data protection level and the third index database having the third data protection level are available.

When a first key notification indicating a protection status of a computing apparatus is received, flow proceeds to operation 406 where a query is sent to each of the first index database, the second index database and the third index database for the requested data based on the protection status of the computing apparatus. For example, when the protection status of the personal device is determined to be unlocked, a query is sent to each of the first index database, the second index database and the third index database based on the unlocked protection status of the computing apparatus.

When a query is sent to each of the first index database, the second index database and the third index database for the requested data based on the protection status of the computing apparatus, flow proceeds to decision operation 408 where it is determined whether a second key notification indicating a change in the protection status of the computing apparatus is received. For example, the key notification may indicate that an encryption key for accessing one or more of the index databases is available. In another example, the key notification may indicate that an encryption key for accessing one or more of the index databases in unavailable. The key notification indicating a change in the protection status of the personal device may be received while the query or queries is/are being executed. In other words, the protection status of the personal device may change before data is received from the query or queries. In another example, the key notification indicating a change in the protection status of the personal device may be received after data is received from the query or queries but before the data is loaded to an application. In yet another example, the key notification indicating a change in the protection status of the personal device may be received after the data is loaded to an application.

When it is determined that a second key notification indicating a change in the protection status of the computing apparatus is not received, flow proceeds to operation 412 where the requested data is loaded to the application. For example, the data received from each query sent to the first index database, the second index database, and the third index database may be sent to the application requesting the data for display in a user interface to the application. When it is determined that a second key notification indicating a change in the protection status of the computing apparatus is received, flow proceeds to operation 410 where at least some of the loaded data is removed from the application based on the change in the protection status of the computing apparatus. For example, when the protection status of the personal device is changed from the unlocked protection status to the locked protection status, at least some of the loaded data is unloaded/removed from the application based on the change in the protection status of the computing apparatus from unlocked to locked. At least some of the loaded data removed from the application based on the change in the protection status of the computing apparatus includes data indexed in the third index database.

Figure 5:
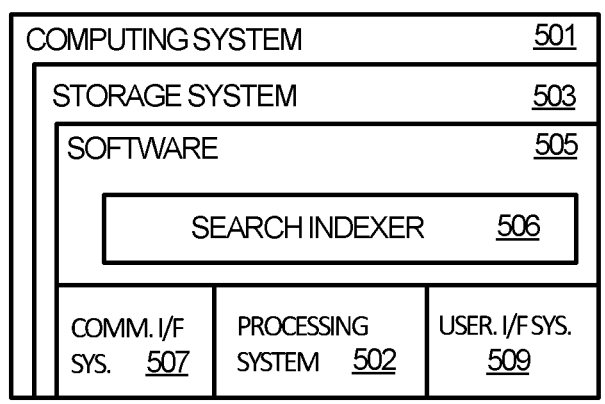
FIG. 5 illustrates a computing system suitable for implementing the enhanced data protection technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes search indexer 506, which is representative of the search indexer component discussed with respect to the preceding FIGS. 1-4. When executed by processing system 502 to enhance data protection systems, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced data protection systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include search indexer 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced data protection systems. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents a computer-implemented method for dynamically adjusting a query, the computer-implemented method comprising: receiving a request for data from an application associated with a personal device; determining a protection status of the personal device; sending one or more queries to one or more index databases in accordance with the protection status of the personal device; receiving a key notification indicating a change in the protection status of the personal device; sending one or more additional queries for additional data to the one or more index databases in accordance with the changed protection status of the personal device; merging data received from the one or more queries with additional data received from the one or more additional queries; and loading the merged data to the application associated with the personal device. In further examples, the computer-implemented method further comprises sending a notification to the application indicating the change in the protection status of the personal device. In further examples, the protection status of the personal device includes at least one of locked, unlocked, and first unlock. In further examples, each index database of the one or more index databases has one of a first data protection level, a second data protection level, or a third data protection level. In further examples, when the personal device has the locked protection status, at least the index database having the third data protection level is unavailable. In further examples, when the personal device has the first unlock protection status, at least the index database having the second data protection level is unavailable. In further examples, when the personal device has the unlocked protection status, the index database having the first data protection level is available, the index database having the second data protection level is available, and the index database having the third data protection level is available. In further examples, determining the protection status of the personal device comprises receiving a key notification indicating an availability of at least one encryption key.

Further aspects disclosed herein provide an exemplary computing apparatus comprising one or more computer readable storage media; and program instructions stored on the one or more computer readable storage media that, when executed by at least one processor, cause the at least one processor to at least: construct a first index database for indexing data, the first index database having a first data protection level; construct a second index database for indexing data, the second index database having a second data protection level; encrypt the second index database based on the second data protection level; construct a third index database for indexing data, the third index database having a third data protection level; encrypt the third index database based on the third data protection level; identify data for indexing, where the data is classified as a data type from a plurality of data types; and index the data identified for indexing in one of the first index database, the second index database, and the third index database based on the data type of the data. In further examples, the plurality of data types includes unprotected, protected until first unlock of the computing apparatus, and protected when the computing apparatus is locked. In further examples, the first data protection level provides access to data classified as the unprotected data type. In further examples, the second data protection level provides access to data classified as the protected until first unlock of the computing apparatus data type. In further examples, the third data protection level provides access to data classified as the protected when the computing apparatus is locked data type. In further examples, the program instructions stored on the one or more computer readable storage media that, when executed by at least one processor, further cause the at least one processor to at least: identify additional data for indexing, where the additional data is classified as at least one of the protected until first unlock of the computing apparatus data type and the protected when the computing apparatus is locked data type. In further examples, the program instructions stored on the one or more computer readable storage media that, when executed by at least one processor, further cause the at least one processor to at least: receive a key notification indicating that at least one of the second index database having the second data protection level and the third index database having the third data protection level is not available for indexing the additional data; and mark the additional data as delayed in an indexing queue. In further examples, program instructions stored on the one or more computer readable storage media that, when executed by at least one processor, further cause the at least one processor to at least: receive the key notification indicating that at least one of the second index database having the second data protection level and the third index database having the third data protection level is available for indexing the additional data; index the additional data in the second index database when the additional data is classified as the protected until first unlock of the computing apparatus data type and the second index database is indicated as available for indexing the additional data; index the additional data in the third index database when the additional data is classified as the protected when the computing apparatus is locked data type and the third index database is indicated as available for indexing the additional data.

Further aspects disclosed herein provide an exemplary apparatus comprising: one or more computer readable storage media; and program instructions stored on the one or more computer readable storage media that, when executed by a processing system, direct the processing system to at least: receive a request for data from an application, where the data is indexed in at least one of a first index database, a second index database and a third index database; receive a first key notification indicating a protection status of the computing apparatus; send a query to each of the first index database, the second index database and the third index database for the requested data based on the protection status of the computing apparatus; load the requested data to the application; receive a second key notification indicating a change in the protection status of the computing apparatus; and remove at least some of the loaded data based on the change in the protection status of the computing apparatus from the application. In further examples, the protection status of the computing apparatus is an unlocked protection status, and wherein the change in the protection status of the computing apparatus is a change from the unlocked protection status to a locked protection status. In further examples, the at least some of the loaded data removed from the application based on the change in the protection status of the computing apparatus includes data indexed in the third index database. In further examples, the program instructions stored on the one or more computer readable storage media that, when executed by a processing system, further direct the processing system to at least send a notification indicating the change in the protection status of the computing apparatus to the application.

Techniques for dynamically adjusting a query based on data protection configurations are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of data protection systems that execute in conjunction with an search indexer program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A computer-implemented method for dynamically adjusting a query, the computer-implemented method comprising:
   receiving a search request from an application associated with a personal device;
   determining a first protection status of the personal device;
   selecting a first index database based on the first protection status, the first index database referencing only data that is accessible when the personal device has the first protection status, to the exclusion of data that is accessible when the personal device has a second protection status;
   sending a query to the first index database to identify a first data responsive to the search request;
   receiving a key notification indicating a change in the protection status of the personal device from the first protection status to the second protection status;
   selecting a second index database based on the second protection status, the second index database referencing only data that is accessible when the personal device has the second protection status;
   sending a query to the second index databases to identify a second data responsive to the search request;
   merging the second data with the first data; and
   loading the merged data to the application.

2. The computer-implemented method of claim 1, further comprising sending a notification to the application indicating the change in the protection status of the personal device.

3. The computer-implemented method of claim 1, wherein the protection status of the personal device includes at least one of locked, unlocked, and first unlock.

4. The computer-implemented method of claim 1, wherein the first index database has a first data protection level, and the second index database has a second data protection level that differs from the first protection level.

5. The computer-implemented method of claim 4, wherein, when the personal device has the first protection status, the first index database is available, based on the first index database having the first data protection level, but the second index database is unavailable, based on the second index database having the second data protection level.

6. The computer-implemented method of claim 4, wherein, when the personal device has the second protection status, the first index database is available, based on the first index database having the first data protection level, and the second index database is available, based on the second index database having the second data protection level.

7. The computer-implemented method of claim 1, wherein determining the protection status of the personal device comprises receiving a key notification indicating an availability of at least one encryption key.

8. The computer-implemented method of claim 1, further comprising:
constructing the first index database;
constructing the second index database; and
encrypting the second index database based on the second data protection level.

9. The computer-implemented method of claim 8, further comprising encrypting the first index database based on the first data protection level.

10. The computer-implemented method of claim 8, wherein the constructing the first index database comprises indexing a first data in the first index database based on the first data having the first data protection level.

11. The computer-implemented method of claim 8, wherein the constructing the second index database comprises:
identifying a first data for indexing while the protection status of the personal device is the first protection status;
marking the first data as delayed in an indexing queue based on the first data having the second data protection level; and
indexing the first data in the second index database based upon the second data having the second data protection level and based upon the receiving the key notification indicating the change in the protection status of the personal device from the first protection status to the second protection status.

12. A computing apparatus comprising:
one or more computer readable storage media; and
program instructions stored on the one or more computer readable storage media that, when executed by a processing system, direct the processing system to at least:
receive a search request from an application;
receive a first key notification indicating that a protection status of the computing apparatus is a second protection status, which differs from a first protection status;
select both a first index database and a second index database based on the second protection status, the first index database referencing only data that is accessible when the personal device has the first protection status, to the exclusion of data that is accessible when the personal device has a second protection status, and the second index database referencing only data that is accessible when the personal device has the second protection status;
send a query to the first index database to identify a first data responsive to the search request;
send a query to the second index database to identify a second data responsive to the search request;
load the first and second data to the application;
receive a second key notification indicating a change in the protection status of the computing apparatus from the second protection status to the first protection status; and
remove the second data from the application based on the change in the protection status of the computing apparatus.

13. The computing apparatus of claim 12, wherein the second protection status of the computing apparatus is an unlocked protection status and the first protection status is a locked protection status, and wherein the change in the protection status of the computing apparatus is a change from the unlocked protection status to the locked protection status.

14. The computing apparatus of claim 13, wherein the second data removed from the application based on the change in the protection status of the computing apparatus includes data indexed in the second index database.

15. The computing apparatus of claim 12, wherein the program instructions stored on the one or more computer readable storage media that, when executed by a processing system, further direct the processing system to at least send a notification indicating the change in the protection status of the computing apparatus to the application.

16. One or more computer readable storage media comprising program instructions, which, when executed, perform steps comprising:
receiving a search request from an application;
determining a first protection status of a computing device;
selecting a first index database based on the first protection status, the first index database referencing only data that is accessible when the computing device has the first protection status, to the exclusion of data that is accessible when the computing device has a second protection status;
sending a query to the first index database to identify a first data responsive to the search request;
receiving a key notification indicating a change in the protection status of the computing device from the first protection status to the second protection status;
selecting a second index database based on the second protection status, the second index database referencing only data that is accessible when the computing device has the second protection status;
sending a query to the second index database to identify a second data responsive to the search request;
merging the second data with the first data; and
loading the merged data to the application.

17. The one or more computer readable storage media of claim 16, wherein the first index database has a first data protection level, and the second index database has a second data protection level that differs from the first protection level.

18. The one or more computer readable storage media of claim 17, wherein, when the personal device has the first protection status, the first index database is available, based on the first index database having the first data protection level, but the second index database is unavailable, based on the second index database having the second data protection level.

19. The one or more computer readable storage media of claim 17, wherein, when the personal device has the second protection status, the first index database is available, based on the first index database having the first data protection level, and the second index database is available, based on the second index database having the second data protection level.

20. The one or more computer readable storage media of claim 16, comprising further program instructions, which, when executed, perform steps comprising:
identifying a first data for indexing while the protection status of the personal device is the first protection status;
marking the first data as delayed in an indexing queue based on the first data having the second data protection level; and indexing the first data in the second index database based upon the second data having the second data protection level and based upon the receiving the key notification indicating the change in the protection status of the personal device from the first protection status to the second protection status.

* * * * *